US010979896B2

(12) United States Patent
Chakra et al.

(10) Patent No.: US 10,979,896 B2
(45) Date of Patent: Apr. 13, 2021

(54) MANAGING DYNAMIC LOCKOUTS ON MOBILE COMPUTING DEVICES

(71) Applicant: International Business Machines Corporation, Armonk, NY (US)

(72) Inventors: Al Chakra, Apex, NC (US); Jenny S. Li, Cary, NC (US); Yu Deng, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 16/195,885

(22) Filed: Nov. 20, 2018

(65) Prior Publication Data

US 2020/0162895 A1 May 21, 2020

(51) Int. Cl.
| | |
|---|---|
| *H04L 29/06* | (2006.01) |
| *H04W 12/00* | (2021.01) |
| *G06F 3/0484* | (2013.01) |
| *H04W 4/02* | (2018.01) |
| *H04M 1/725* | (2021.01) |
| *H04W 12/06* | (2021.01) |

(52) U.S. Cl.
CPC ........ *H04W 12/003* (2019.01); *G06F 3/0484* (2013.01); *H04M 1/72577* (2013.01); *H04W 4/023* (2013.01); *H04W 12/0027* (2019.01); *H04W 12/00503* (2019.01); *H04W 12/06* (2013.01)

(58) Field of Classification Search
CPC ....................................................... H04L 63/10
See application file for complete search history.

(56) References Cited

U.S. PATENT DOCUMENTS

| | | |
|---|---|---|
| 7,953,870 B1 | 5/2011 | Reeves |
| 8,682,402 B2 | 3/2014 | Pratt |
| 9,256,268 B2 | 2/2016 | Wang |
| 9,491,268 B2 | 11/2016 | Duda |

(Continued)

OTHER PUBLICATIONS

"Set your Android device to automatically unlock", Android Help, printed on Nov. 12, 2018, 6 pages, <https://support.google.com/android/answer/9075927?hl=en&ref topic=6168852&visit_id=636776478763517159-1682661962&rd=1>.

(Continued)

*Primary Examiner* — Jason K Gee
(74) *Attorney, Agent, or Firm* — Michael A. Petrocelli

(57) ABSTRACT

A dynamic lockout technique for mobile computing devices is provided. A mobile computing device having a user interface in an active mode identifies foreign computing devices that are connected to a shared network. The mobile computing device determines determining that each foreign computing device is a recognized device, and in response, determines whether a paired device is in proximity to the mobile computing device based on a signal transmitted by the paired device. The mobile computing device maintains the active mode if the paired device is in proximity. The mobile computing device identifies a new foreign computing device that is connected to the shared network. The mobile computing device activates a lockout mode for the user interface while the paired device is in proximity to the mobile computing device if the new foreign computing device is an unrecognized device in proximity to the mobile computing device.

20 Claims, 5 Drawing Sheets

(56) References Cited

U.S. PATENT DOCUMENTS

| | | |
|---|---|---|
| 9,497,270 B2 | 11/2016 | Burch |
| 9,692,875 B2 | 6/2017 | Novet |
| 9,860,846 B2 | 1/2018 | Kolaks |
| 2003/0217289 A1* | 11/2003 | Ammon ............. H04L 63/1416 726/23 |
| 2006/0019679 A1* | 1/2006 | Rappaport ............ G01S 5/0252 455/456.5 |
| 2007/0074062 A1 | 3/2007 | Chang |
| 2008/0062863 A1 | 3/2008 | Ginde |
| 2013/0003559 A1 | 1/2013 | Matthews |
| 2016/0246753 A1* | 8/2016 | Tan ...................... G06F 13/404 |
| 2017/0187579 A1 | 6/2017 | Borch |
| 2017/0269675 A1 | 9/2017 | Klacar |

OTHER PUBLICATIONS

Behan, M., "Sensorial Networks embedded in Mobile Devices", Dissertation, University of Hradec Králové, 2015, 114 pages.

Kim et al. "Hand grip pattern recognition for mobile user interfaces." Proceedings of the National Conference on Artificial Intelligence. vol. 21. No. 2. Menlo Park, CA; Cambridge, MA; London; AAAI Press; MIT Press; 1999, 2006, p. 1789-1794.

* cited by examiner

MANAGING DYNAMIC LOCKOUTS ON MOBILE COMPUTING DEVICES

TECHNICAL FIELD

The present invention relates generally to the field of mobile computing devices and, more particularly, to managing dynamic lockouts on mobile computing devices.

BACKGROUND

In computing technology it is often necessary to regulate access to applications and data stored on a particular computing device or accessible via the computing device. Lock screens are one method of regulating access. In general, a lock screen is a user interface element that regulates access to computing resources by requiring a user to authenticate or reauthenticate themselves when the lock screen is enabled. Lock screens can be implemented on an operating system (OS) level or an application level (e.g., session timeouts). In some instances, a lock screen is enabled after a threshold period of inactivity on a user interface. In other instances, a lock screen is enabled after a user performs a specified action for locking a respective computing device or resource. When a lock screen is enabled, any attempt to access the protected resources will cause the computing device to display the lock screen. For example, a graphical user interface may display a lock screen including elements for entering user identification (e.g., a user ID) and/or a password prior to permitting a user access to the protected resources. In addition to one or more means of authenticating a user, a lock screen may present a limited amount of additional information, (e.g., a date and time, weather conditions, or other non-restricted information) and/or may allow varying degrees of access to a limited number of applications (e.g., a clock application, a weather application, or other non-restricted applications).

SUMMARY

According to one embodiment of the present invention, a method for managing dynamic lockout functionality is provided. The method includes: identifying, by a mobile computing device having a user interface in an active mode, one or more foreign computing devices that are connected to a shared network; in response to determining, by the mobile computing device, that each foreign computing device of the one or more foreign computing devices is a recognized device, determining, by the mobile computing device, whether a paired device is in proximity to the mobile computing device based on a signal transmitted by the paired device; in response to determining, by the mobile computing device, that the paired device is in proximity to the mobile computing device, the mobile computing device maintaining the active mode; identifying, by the mobile computing device, a new foreign computing device that is connected to the shared network; and in response to determining, by the mobile computing device, that the new foreign computing device is an unrecognized device that is in proximity to the mobile computing device, activating a lockout mode for the user interface while the paired device is in proximity to the mobile computing device.

According to another embodiment of the present invention, a computer program product for managing dynamic lockout functionality is provided. The computer program product comprises a computer readable storage medium and program instructions stored on the computer readable storage medium. The program instructions include: program instructions to identify, by a mobile computing device having a user interface in an active mode, one or more foreign computing devices that are connected to a shared network; program instructions to, in response to determining, by the mobile computing device, that each foreign computing device of the one or more foreign computing devices is a recognized device, determine, by the mobile computing device, whether a paired device is in proximity to the mobile computing device based on a signal transmitted by the paired device; program instructions to, in response to determining, by the mobile computing device, that the paired device is in proximity to the mobile computing device, maintain the active mode on the mobile computing device; program instructions to identify, by the mobile computing device, a new foreign computing device that is connected to the shared network; and program instructions to, in response to determining, by the mobile computing device, that the new foreign computing device is an unrecognized device that is in proximity to the mobile computing device, activating a lockout mode for the user interface while the paired device is in proximity to the mobile computing device.

According to another embodiment of the present invention, a computer system for managing dynamic lockout functionality is provided. The computer system includes one or more computer processors, one or more computer readable storage media, and program instructions stored on the computer readable storage media for execution by at least one of the one or more processors. The program instructions include: program instructions to identify, by a mobile computing device having a user interface in an active mode, one or more foreign computing devices that are connected to a shared network; program instructions to, in response to determining, by the mobile computing device, that each foreign computing device of the one or more foreign computing devices is a recognized device, determine, by the mobile computing device, whether a paired device is in proximity to the mobile computing device based on a signal transmitted by the paired device; program instructions to, in response to determining, by the mobile computing device, that the paired device is in proximity to the mobile computing device, maintain the active mode on the mobile computing device; program instructions to identify, by the mobile computing device, a new foreign computing device that is connected to the shared network; and program instructions to, in response to determining, by the mobile computing device, that the new foreign computing device is an unrecognized device that is in proximity to the mobile computing device, activating a lockout mode for the user interface while the paired device is in proximity to the mobile computing device.

DETAILED DESCRIPTION

Figure 1:
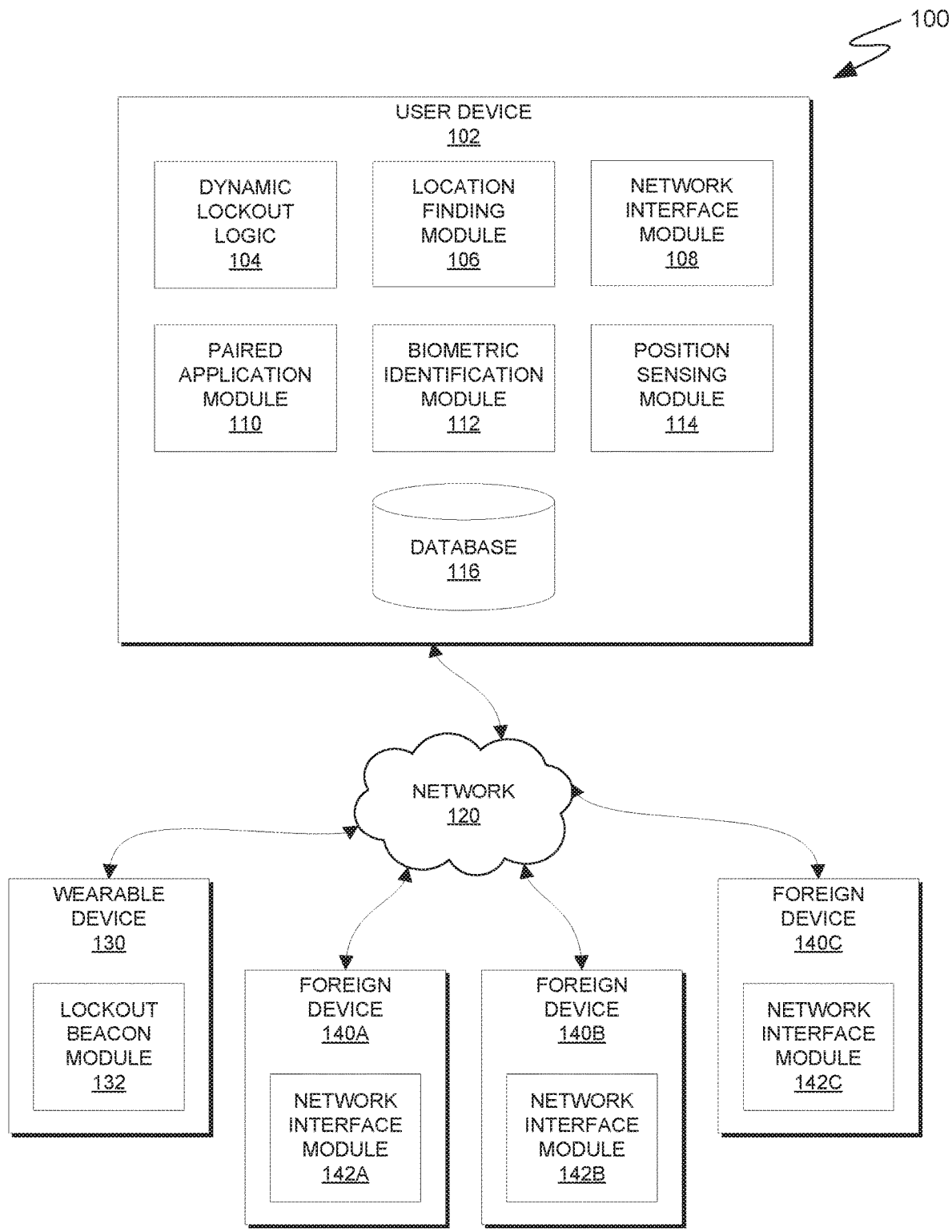
FIG. 1 is a functional block diagram illustrating a computing environment, in accordance with an embodiment of the present invention.

Embodiments of the present invention recognize that it is advantageous for computing devices to provide a user experience that balances convenience and security. Embodiments of the present invention further recognize that an optimum balance of convenience and security can change based on changes in the context of where a computing device is used, how a computing device is used, and the identity of a user of a computing device, among other factors. While the use of a lock screen can, for example, restrict access on a mobile computing device (e.g., smartphones, tablets, notebooks, etc.) when a user steps away from the device or sets the device aside for a threshold length of time, any one threshold length of time may be too short in some locations and instances (e.g., in one's home, in one's place of business, or among only trusted individuals) and too long in other locations (e.g., a public place and/or among strangers) to provide an advantageous balance of convenience and security in each location and instance. Similarly, any one threshold length of time may be too long with respect to some applications (e.g., a banking application) while too short with respect to other applications (e.g., an electronic book).

Additionally, embodiments of the present invention recognize that any one threshold length of time may be too short while a user engages in some activities and too long during other activities. For example, walking or traveling via public transportation may provide numerous and frequent opportunities for a user to interact with a mobile computing device (e.g., to view address information, a map, electronic messages, or entertainment) while at other time requiring the user to direct his or her attention towards the act of traveling (e.g., crossing roadways, paying fares, or giving directions). Embodiments of the present invention therefore recognize that, in general, users often find aggressive lockout policies (e.g., short lockout thresholds) onerous when they must reauthenticate themselves frequently, and as a consequence, users may disadvantageously employ less secure means of lockout authentication or no means of lockout authentication at all.

Furthermore, embodiments of the present invention recognize that a user may lend a mobile computing device to others so that they may view, copy, or transcribe only specific information presented on the device, and that it is advantageous to select from among a plurality of lockout out policies having varying degrees of aggressiveness (e.g., varying lockout thresholds), and/or adjust or modify a lockout policy based on the identity of the person in possession of the device.

Recognizing that numerous factors affect an optimum balance of convenience and security, embodiments of the present invention provide a mobile computing device with a dynamic lockout policy that adjusts various lockout parameters based on contextual information describing, at least in part, where the computing device is operating, how the computing device is operating, and/or the identity of the user of the computing device, as described herein. Providing a dynamic lockout policy in this manner realizes several advantages. For example, decreasing lockout restrictions (i.e., adopting a less secure, less aggressive policy) when the contextual information indicates that it is reasonable to do so advantageously disincentives users from adopting a less secure static lockout policy to prioritize convenience over security. On the other hand, increasing lockout restrictions (i.e., adopting a more secure, more aggressive policy) only when the contextual information indicates that it is advantageous to do so provides increased security in situations where it is most beneficial. Additionally, adopting a less restrictive, less aggressive lockout policy when reasonable to do so can reduce the frequency with which mobile computing devices display lock screens because the lock screens are unnecessary in such contexts. Displaying lock screens consumes processor cycles, memory, and power, among other computing resources; and therefore, displaying lock screens only when advantageous enables other processes to consume more resources compared to when a more restrictive, aggressive lockout policy is utilized. Moreover, reducing lock screen frequency reduces a user's time spent authenticating or reauthenticating themselves, time that may be spent more productively using the device for other tasks.

Embodiments of the present invention will now be described in detail with reference to the Figures. It is to be understood that these embodiments are described only for the purpose of illustration and to help those skilled in the art to understand and implement specific embodiments of the present invention, without suggesting any limitation as to the scope of the invention. The invention described herein can be implemented in various manners other than the ones explicitly described herein.

FIG. 1 is a functional block diagram illustrating a computing environment for providing a dynamic lockout policy, in accordance with an embodiment of the present invention. For example, FIG. 1 is a functional block diagram illustrating computing environment 100. Computing environment 100 includes user device 102, wearable device 130, foreign device 140A, foreign device 140B, and foreign device 140C, which are interconnected via network 120. Foreign device 140A, foreign device 140B, and foreign device 140C are herein referred to collectively as foreign devices 140.

In various embodiments, user device 102 is a computing device that can be a smartphone, a tablet computer, a netbook computer, a laptop computer, a personal computer (PC), or a desktop computer. In other embodiments, user device 102 represents a computing system comprising a plurality of computer devices that provide the functionality attributed to user device 102 (e.g., one or more aspects of user device 102 can respectively employ a client-server computing model or a cloud computing model). In general, user device 102 can be implemented as any computing device or combination of devices capable of executing the operations attributed to dynamic lockout logic 104 and, for example, with access to wearable device 130 and foreign devices 140. In the embodiment depicted in FIG. 1, user device 102 includes dynamic lockout logic 104, location finding module 106, network interface module 108, paired application module 110, biometric identification module 112, position sensing module 114, and database 116. User device 102 may also include internal and external hardware components, as depicted and described in further detail with respect to FIG. 4.

Users of user device 102 can interact with user device 102 and applications and processes executing on user device 102 via a user interface (not shown) that executes locally on user device 102 and operates to provide the user interface (e.g., a graphical user interface) to the user of user device 102. In various embodiments the user interface operates, in part, to display one or more lock screens and present one or more means of user authentication, as described herein, and can also interface with one or more user input devices (e.g., a keypad, a touchpad, a mouse, a camera, a microphone, a haptic sensors, a fingerprint sensor, a piezoelectric sensor, a capacitive sensor, etc.) to receive user input and/or authenticating information.

In general, dynamic lockout logic 104 operates to provide dynamic control of lockout functionality on user device 102. In some embodiments dynamic lockout logic 104 represents a logical component of an operating system of user device 102 or interfaces with an operating system of user device 102 (e.g., via an operating system application program interface (API)) to provide dynamic control of operating system lockout functionality. In other embodiments dynamic lockout logic 104 is similarly provisioned with respect to one or more applications to provide dynamic control of application lockout functionality, as described herein. In view of the description of dynamic lockout logic 104 herein, persons of ordinary skill in the art will understand that various combinations and modifications of operating system level lockout functionality and application level lockout functionality are possible, and that dynamic lockout logic 104 may interface with any such combination or modification to provide the functionality described herein. Additionally, dynamic lockout logic 104 can be stored on user device 102, as depicted in FIG. 1, or can reside on another computing device, provided that various hardware and software components of user device 102 and device(s) executing dynamic lockout logic 104 are operatively and communicatively connected (e.g., via network 120).

To provide dynamic control of lockout functionality on user device 102, dynamic lockout logic 104 can interface with various hardware and/or software components of user device 102 to access information that enables user device 102 to determine and/or make inferences regarding the environment or context in which user device 102 is operating. In the embodiment depicted in FIG. 1, dynamic lockout logic 104 can interface with location finding module 106, network interface module 108, paired application module 110, biometric identification module 112, position sensing module 114, and database 116.

In general, location finding module 106 and network interface module 108 operate to identify a location of user device 102 and/or location(s) of other computing device(s) in the surrounding environment (e.g., wearable device 130 and/or foreign devices 140). In some embodiments, location finding module 106 operates to identify the location of user device 102 using one or more techniques. For example, location finding module 106 can, in various embodiments: interface with one or a combination of geolocation technologies (e.g., satellite navigation, radio navigation, communication network navigation, etc.); employ one or a combination of position-finding techniques including received signal strength indication (RSSI), time-of-flight, multilateration (e.g., trilateration), and multiangulation (e.g., triangulation); and/or utilize data and/or metadata embedded within a received signal to determine a location of user device 102. Additionally, in some embodiments, location finding module 106 can interface with one or more databases stored on user device 102 and/or an external computing device (e.g., one accessed via network 120) to associate a set of coordinates (e.g., latitude and longitude coordinates) with a named location (e.g., a structure, a park, a natural area, etc.). As described herein, in various embodiments dynamic lockout logic 104 can dynamically adjust a lockout policy based, at least in part, on the location of user device 102. For example, dynamic lockout logic 104 can implement a less aggressive, less restrictive lockout policy if a location of user device 102 is identified as a home of the user and implement a more aggressive, more restrictive lockout policy if the location of user device 102 is identified as a public place, such as a restaurant or public transportation station.

As used herein, network interface module 108 refers to a combination of software, hardware, or firmware that provides the ability to receive and/or transmit signals to facilitate the identification of location(s) of respective computing device(s) with respect to the location of user device 102 (e.g., the identities and locations of wearable device 130 and foreign devices 140). In some embodiments, for example, network interface module 108 operates to receive and/or transmit signals over a network (e.g., network 120) to identify any computing devices that are connected to the network and the location of each such device. For example, a networked computing device can be identified by its media access control (MAC) address. In some embodiments, network interface module 108 interfaces with a plurality of networks and/or different types of networks. In the embodiment depicted in FIG. 1, for example, network interface module 108 may interface with foreign devices 140 via a first type of network (e.g., a wireless local area network) and interface with wearable device 130 via a second type of network (e.g., a near-field, wireless body area, or personal area network). In general, network 120 can represent one or more types of networks including networks of varying spatial scope, such as near-field, wireless body area, personal area, near-me area, local area, and/or wide area networks. Such networks may employ one or a combination of wired, wireless, fiber optic, or any other connection known in the art. Additionally, in some embodiments, network 120 can represent or include one or more forms of one-way communication (e.g., a signal broadcast by one or more of foreign devices 140, wearable device 130, or a positioning beacon).

Figure 2A:
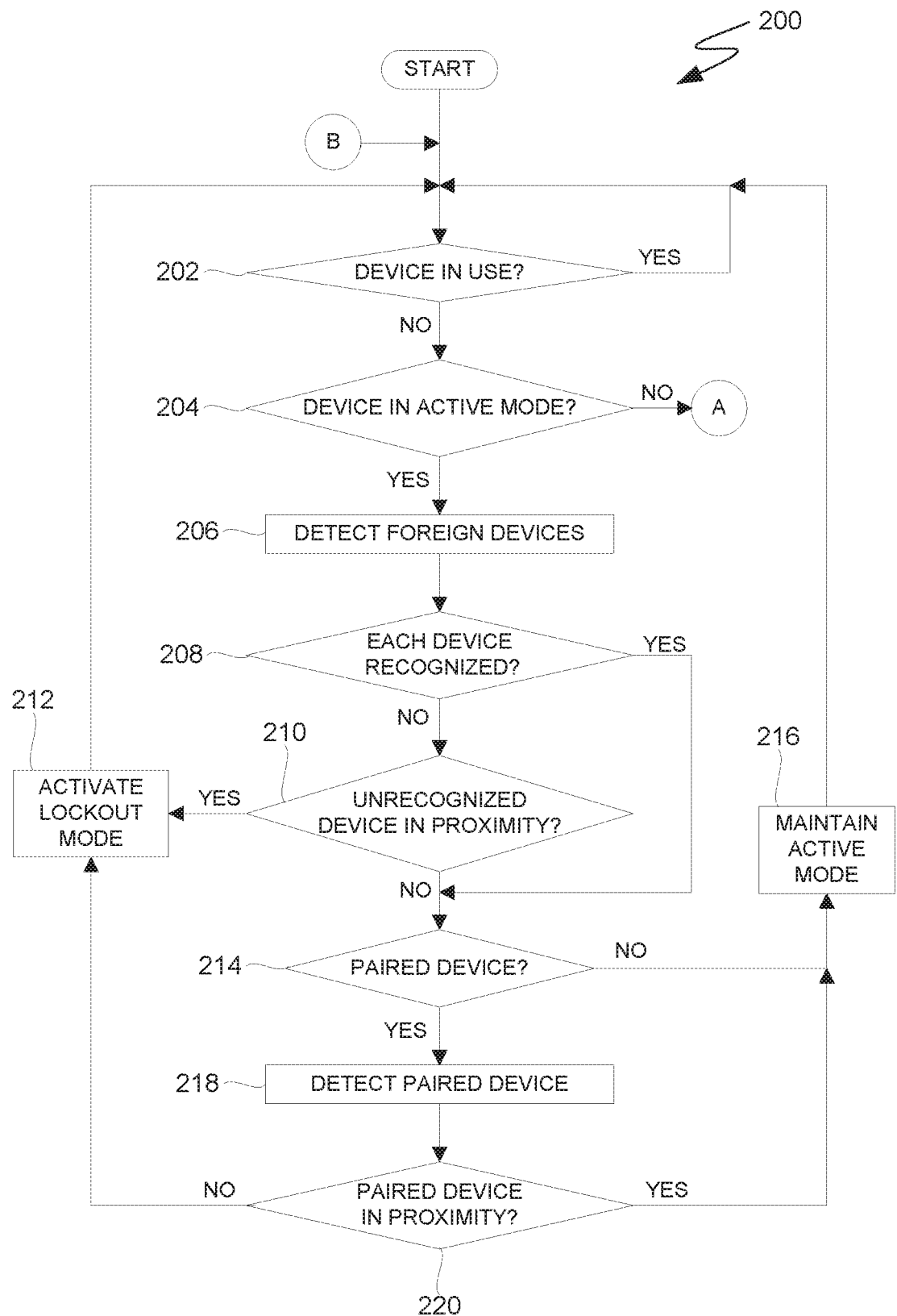
FIG. 2A is a flowchart depicting operations for providing a dynamic lockout technique, on a computing device within the computing environment of FIG. 1, in accordance with an embodiment of the present invention.
Figure 2B:
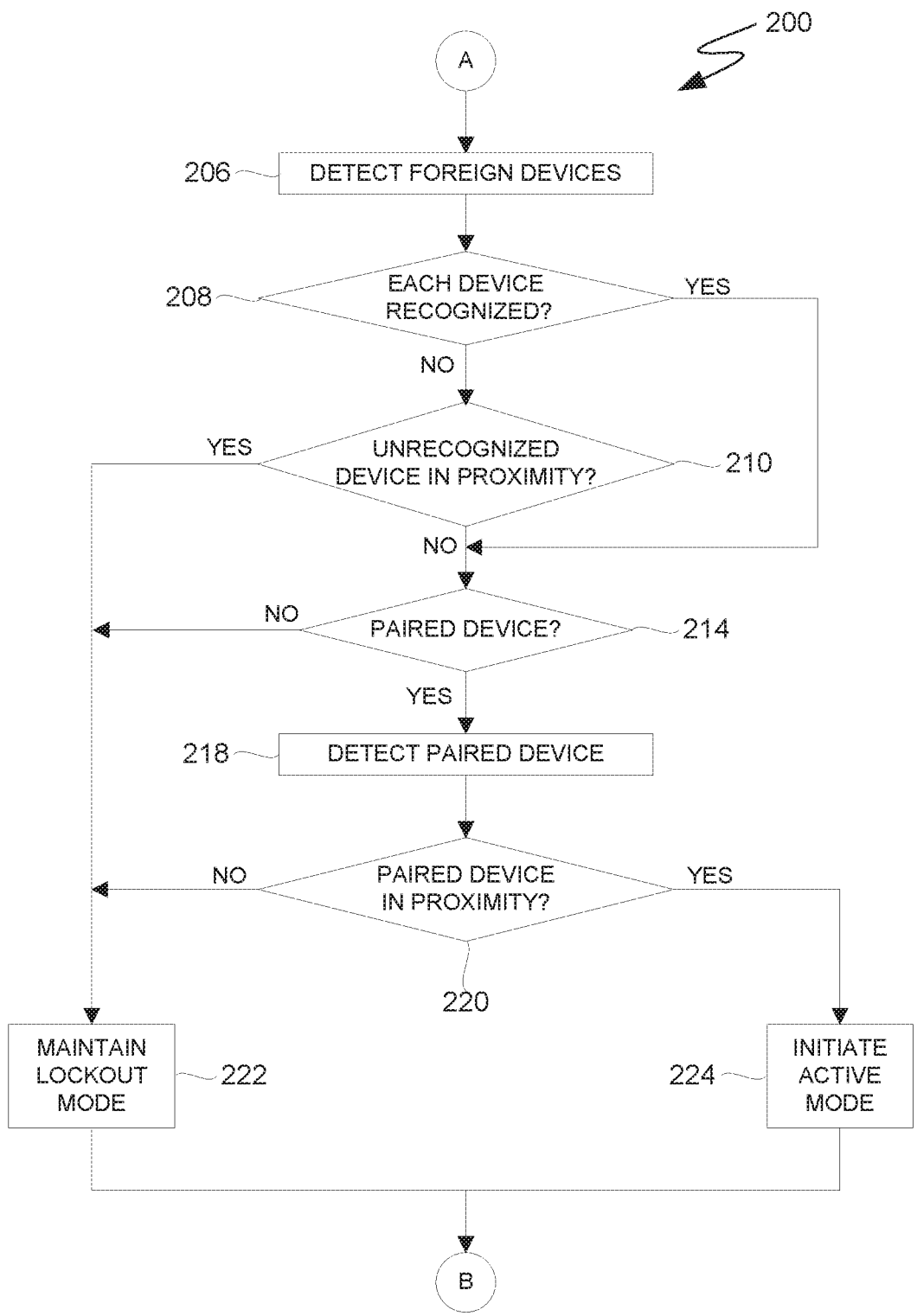
FIG. 2B is a flowchart depicting operations for a dynamic lockout technique, on a computing device within the computing environment of FIG. 1, in accordance with an embodiment of the present invention.

As described in greater detail with respect to FIGS. 2A and 2B, network interface module 108 facilitates the recognition of computing devices in proximity to user device 102 by identifying such devices and determining the location(s) of such devices, enabling dynamic lockout logic 104 to adjust lockout policies based on the identities and proximity of such devices. In the embodiment depicted in FIG. 1, dynamic lockout logic 104 can determine whether such devices are recognized by comparing the identities of such devices (e.g., foreign devices 140) to a list of registered and recognized (i.e., trusted) devices stored in database 116. In general, database 116 is a data repository that may be written to and read by one or both of dynamic lockout logic 104. In various embodiments, database 116 stores list(s) of recognized devices (e.g., smartphones, tablets, laptops, etc. of family, friends, or coworkers), one or more lockout policies, and/or code representing dynamic lockout logic 104. In some embodiments, database 116 may be written to and read by programs and entities outside of computing environment 100 in order to populate database 116 with any of the aforementioned types of data. Additionally, database 116 can be implemented, at least in part, as a repository hosted by a computing device other than user device 102 provided database 116 is accessible by user device 102 (e.g., via network 120).

In general, paired application module 110 represents logic for identifying applications and/or processes executing on user device 102 and determining whether such applications and/or processes are paired with dynamic lockout logic 104. As used herein, a paired application refers to any application or process that when executing on user device 102 causes dynamic lockout logic 104 to adjust or modify a concurrently operative lockout policy. In the embodiment depicted in FIG. 1, database 116 can store a list of paired applications, which dynamic lockout logic 104 can access in order to determine whether to adjust or modify an operative lockout policy. Functionality representing paired application module 110 is described in greater detail with respect to FIG. 3.

Biometric identification module 112 represents a combination of software, hardware, or firmware that permits the identification of a user or person in possession of user device 102. For example, in various embodiments, biometric identification module 112 can represent a finger print sensor, a camera, a microphone, one or more haptic sensors, one or more piezoelectric sensors, or one or more capacitive sensors and any code or data (e.g., biometric profiles) that facilitate the identification of the user or possessor of user device 102 and/or whether their identity corresponds to an identity of a registered user (e.g., an owner of user device 102 or a person to whom the owner of user device 102 permits use of user device 102). In the embodiment depicted in FIG. 1, database 116 can store biometric profiles of registered users. In other embodiments, database(s) and/or computing devices outside of computing environment 100 may respectively store biometric information and identify users of user device 102 based, at least in part, on data received from user device 102 provided user device 102 can access such databases (e.g., via network 120). The functionality provided by biometric identification module 112 is described in greater detail with respect to FIG. 3.

Position sensing module 114 represents a combination of software, hardware, or firmware that facilitates the determination of the position of user device 102 in space and how the position of user device 102 in space changes over time. For example, in various embodiments, position sensing module 114 can represent various micro-electro-mechanical systems (MEMS) including accelerometers, gyroscopes, and compasses for identifying movements of user device 102 in one or more degrees of freedom over time. In some embodiments, position sensing module 114 can interface with, utilize, or represent, in part, aspects of location finding module 106 to identify movement of user device 102 as opposed to a location of user device 102 (i.e., identifying movement via changes in location). The functionality provided by position sensing module 114 is described in greater detail with respect to FIG. 3.

In general, wearable device 130 is any combination of software, hardware, or firmware representing a physical token from which dynamic lockout logic 104 can infer a position or location of a user of user device 102 in relation to a position or location of user device 102 while the user is in possession of wearable device 130 and therefore authenticate the user as an owner or authorized user of user device 102. In some embodiments, wearable device 130 is a wearable computing device such as a smart watch, electronic headset, or ornamentation (e.g., jewelry) providing the functionality of wearable device 130. In other embodiments, wearable device 130 is or includes a passive, semi-active, or active electronic tag, such as a radio-frequency identification tag or near-field magnet induction tag. Additionally, some embodiments of the invention do not require that wearable device 130 be "worn" by a person in possession of wearable device 130. For example, a small handheld device, such as a smartphone, that is carried by a person, stored in a pocket of the person's clothing, or stored in a bag that the person is carrying are considered instances of wearable device 130 provided such devices provide the functionality of wearable device 130 (e.g., a smartphone may be used to unlock a laptop computer).

Wearable device 130 includes lockout beacon module 132 that represents any combination of software, hardware, or firmware enabling wearable device 130 to determine its location and/or position and/or communicate with user device 102 such that user device 102 can determine or infer the location and/or position of wearable device 130 in relation to user device 102. Accordingly, lockout beacon module 132 can incorporate analogous aspects of location finding module 106, network interface module 108, and position sensing module 114 of user device 102. In some embodiments, for example, wearable device 130 can communicate a location of wearable device 130 derived from a satellite navigation system to user device 102 via a local wireless network. In other embodiments, wearable device 130 can act as a beacon and broadcast a signal including data and/or metadata (e.g., identifying wearable device 130, a time of broadcast, a signal frequency, or a broadcast power) that enable dynamic lockout logic 104 to infer the location and/or position of wearable device 130 in relation to user device 102. Persons of ordinary skill in the art will appreciate that various position-finding, location-finding, and communication protocols exist. In general, numerous factors influence selection of an appropriate protocol or combination of protocols. For example, such factors can include the computing capabilities of user device 102 and wearable device 130, the availability of navigation signals (e.g., satellite navigation signals and communication system navigation signals), the availability of communication networks, and the desired proximity threshold(s), as described with respect to FIGS. 2A and 2B. In general, position-finding, location-finding, and communication protocols of relatively small spatial scope (e.g., near-field, body-area, personal area, and near-me area protocols) can advantageously provide the functionality between wearable device 130 and user device 102 where proximity thresholds, as described with respect to FIGS. 2A and 2B, are within the capabilities of such protocols.

In various embodiments, each of foreign devices 140 (i.e., foreign devices 140A, 140B, and 140C) depicted in FIG. 1 represents a computing device other than user device 102 (e.g., computing devices, such as smartphones, in possession of a person other than the user of user device 102). Other embodiments can include a greater or lesser count of foreign devices 140 without departing from the scope of the present disclosure. In general, any foreign device of foreign devices 140 can be a smartphone, a tablet computer, a netbook computer, a laptop computer, a personal computer (PC), or a desktop computer. Accordingly, foreign devices 140 can, in general, possess similar computing capabilities to user device 102 and can therefore include features analogous to location finding module 106, network interface module 108, and position sensing module 114 of user device 102. In the embodiment depicted in FIG. 1, for example, foreign devices 140A, 140B, and 140C respectively include network interface module 142A, network interface module 142B, and network interface module 142C, which are collectively referred to as network interface modules 142 herein. In this embodiment network interface modules 142 are analogous to network interface module 108, and accordingly, network interface modules 142 represent any combination of software, hardware, or firmware enabling foreign devices 140 to respectively communicate (e.g., via network 120) with user device 102 such that dynamic lockout logic 104 can determine the location and/or position of foreign devices 140 with respect to user device 102.

In various embodiments, foreign devices 140 can determine their respective locations and/or positions similarly to user device 102 (e.g., via analogous instances of location finding module 106 and/or position sensing module 114) and/or the location/position of foreign devices 140 in relation to user device 102 can be determined similarly to wearable device 130. Foreign devices 140 can use various position-finding, location-finding, and communication protocols to facilitate the functionality of dynamic lockout logic 104 described herein, and respective instances of network interface modules 142 can be individually configured to support such protocols. The set of protocols can also differ among foreign devices 140. Because the user of user device 102 may not have access to one or more of foreign devices, it is not necessarily possible to anticipate the capabilities and protocols used by all of foreign devices 140 for position-finding, location-finding, or communicator. Accordingly, it is advantageous to configure location finding module 106, network interface module 108, and position sensing module 114 of user device 102, to support the anticipated protocols in use by foreign devices 140. The use of the positions of foreign devices 140 with respected to dynamic lockout logic 104 is described in greater detail with respect to FIGS. 2A and 2B.

FIGS. 2A and 2B are flowcharts depicting operations for providing a dynamic lockout policy, on a computing device within the computing environment of FIG. 1, in accordance with an embodiment of the present invention. For example, FIG. 2A is a flowchart depicting operations 200 of dynamic lockout logic 104 on user device 102 when user device 102 is in an active mode. Similarly, FIG. 2B is a flowchart depicting operations 200 of dynamic lockout logic 104 on user device 102 when user device 102 is not in an active mode (i.e., while in a lockout mode). As used herein, executing operations 200, via one of various logical routes, and returning to operation 202 represents an iteration of operations 200.

In general, operations 200 of dynamic lockout logic 104 operate to dynamically determine when to activate a "lockout mode," and thus lock user device 102, based on contextual information describing the environment in which user device 102 is operating. Operations 200 execute while user device 102 is turned on and not in a sleep mode (e.g., operations 200 can initiate when user device 102 is turned on or woken from a sleep mode) and terminate when user device 102 is turned off and/or place in a sleep mode. As used herein, a lockout mode refers to a mode of operation in which access to user device 102, or an application executing on user device 102, is regulated by use of a lock screen. In order to gain or regain access to user device 102 or an application executing on user device 102, a user of user device 102 must authenticate or reauthenticate themselves to gain further access to user device 102. Conversely, an "active mode," as used herein, refers to a mode of operation in which any person in possession of user device 102 may interact with user device 102 (e.g., when user device 102 is protected via an operating system level lock screen) or an application executing on user device 102 (e.g., when an application installed on user device 102 is protected via an application level lock screen) without encountering a lock screen. If user device 102 is in an active mode and currently in active use (e.g., a user is actively utilizing a user interface of user device 102; decision 202, YES branch), logic to determine whether to activate the lockout mode is suppressed (i.e., dynamic lockout logic 104 periodically executes decision 202 until user device 102 in not in active use). In some embodiments, whether user device 102 is in active use is governed by the types of processes executing on user device 102 and a polling rate at which process logs are searched for such types of processes. For example, processes or applications representing playing a video or utilizing an electronic book application on user device 102, even if no user interface actions are recorded during a polling period, can qualify as active use in some embodiments.

If user device 102 is not in active use (decision 202, NO branch), dynamic lockout logic 104 determines whether user device 102 is in active mode (decision 204, YES branch) or lockout mode (decision 204, NO branch). If user device 102 is in lockout mode, dynamic lockout logic 104 proceeds to follow the logic described with respect to FIG. 2B. If user device 102 is in active mode, dynamic lockout logic 104 detects any foreign computing devices (e.g., foreign devices 140) in its vicinity, if any (operation 206). In the embodiment of user device 102 depicted in FIG. 1, for example, dynamic lockout logic 104 can interface with network interface module 108 to detect foreign computing devices within range of user device 102 and/or connected to a communications network to which user device 102 is connected. As described previously with respect to FIG. 1, network interface module 108 can utilize communication protocols of varying spatial scope to receive, over the air and/or via physical connections, signals broadcast directly by foreign computing devices and/or network data or metadata. In some embodiments detecting foreign computing devices includes any one or any combination of (i) transmitting a query and/or interrogation signal to determine whether any foreign computing devices are connected to a network or present within a physical space and (ii) receiving a signal from one or more foreign devices connected to a network or present within a physical space. In various embodiments, detecting foreign computing devices includes identifying the foreign computing devices. For example, in some embodiments, dynamic lockout logic 104 utilizes network interface module 108 to obtain the MAC address of each foreign computing device detected. In general, dynamic lockout logic 104 can maintain a list of detected foreign devices (e.g., in database 116), removing foreign devices when they are no longer detected and adding new foreign devices when they are detected (i.e., a new foreign device not detected in the immediately preceding iteration of operation 206, but a foreign device that may or may not be recognized, as described herein).

For each detected foreign computing device, dynamic lockout logic 104 determines whether the foreign computing device is a recognized device or that there are no foreign computing devices present (decision 208). Dynamic lockout logic 104 is configured to infer that there is not a significant threat to data and/or functionality accessible via user device 102 when no foreign computing devices are detected. In the embodiment depicted in FIG. 1, for example, dynamic lockout logic 104 can query database 116 to determine whether a MAC address of a foreign computing device corresponds to a MAC address of a recognized, registered computing device listed in database 116. It can, for example, be advantageous for an owner of user device 102 and/or an authorized user of user device 102 to identify computing devices belonging to one's family members, friends, or specific coworkers, as registered, trusted computing devices. Embodiments of the present invention infer that persons in possession of registered computing devices are not likely to pose a security and/or privacy risk to data and/or functionality accessible via user device 102 due to their respective relationships to the owners and/or authorized users of user device 102, and therefore, that it is reasonable to relax lockout policy restrictions and/or delay activation of a lockout mode when dynamic lockout logic 104 determines that the detected foreign computing devices are registered computing devices.

In the embodiment of dynamic lockout logic 104 depicted in FIG. 2A, dynamic lockout logic 104 determines whether each unrecognized foreign computing device (i.e., a foreign computing device that is not a registered computing device) is in proximity to user device 102 (decision 210; decision 208, NO branch). As described with respect to FIG. 1, dynamic lockout logic 104 can interface with location finding module 106 and network interface module 108 to determine the location and/or position of user device 102 with respect to foreign computing devices (e.g., foreign devices 140). In various embodiments one or any combination of (i) threshold distance(s) between user device 102 and a foreign computing device, (ii) presence at the same physical location (e.g., the same restaurant, park, or store); and (iii) a shared network (e.g., a shared local area network) represent proximity to user device 102. As used herein, a shared network can refer to any network described with respect to network 120 of FIG. 1, including one-way communication from one device to another (e.g., where a first device broadcasts a signal that is received by a second device without a signal sent in response by the second device). In some embodiments, proximity thresholds and/or threshold criteria are user configurable settings. If dynamic lockout logic 104 determines that an unrecognized foreign computing device is in proximity to user device 102 (decision 210, YES branch), dynamic lockout logic 104 activates a lockout mode (operation 212). For example, dynamic lockout logic 104 can cause user device 102 to present a lock screen immediately or upon exiting a sleep mode or screensaver mode. Unrecognized foreign computing devices that are not in proximity to user device 102 (decision 210, NO branch), are not considered likely to pose a security and/or privacy risk to data and/or functionality accessible via user device 102 due to the inferred distance and/or isolation from user device 102. For example, an unrecognized foreign computing device not in proximity to user device 102 may be at a distance greater than a threshold distance, at a different location (e.g., a different restaurant, park or store), or may not share a network connection with user device 102. Additionally, in some embodiments, dynamic lockout logic 104 evaluates a count of unrecognized foreign computing devices in proximity to user device 102 against a threshold count, and dynamic lockout logic 104 activates the lockout mode (operation 212) based on the count only if the count exceeds the threshold count.

If, in the embodiment depicted in FIG. 2A, dynamic lockout logic 104 determines that each detected foreign computing device is a recognized device, that no foreign computing devices were detected, (decision 208, YES branch), or that each unrecognized device is not in proximity to user device 102 (decision 210, NO branch), dynamic lockout logic 104 determines whether it is configured to lock or unlock user device 102 based on the presence or absence of a paired electronic device (e.g., wearable device 130). If dynamic lockout logic 104 determines that it is not configured to lock or unlock user device 102 based on the presence or absence of a paired electronic device (decision 214, NO branch), dynamic lockout logic 104 maintains the active mode on user device 102 (operation 216). If dynamic lockout logic 104 determines that it is configured to lock or unlock user device 102 based on the presence or absence of a paired electronic device (decision 214, YES branch), dynamic lockout logic 104 identifies each paired device (operation 218; e.g., by querying database 116 for a list of paired devices). For each paired device, dynamic lockout logic 104 determines whether the paired device is in proximity to user device 102 (e.g., by sending an interrogation signal and/or listening for a signal from any paired devices). As previously described with respect to determining the proximity of detected foreign computing devices, dynamic lockout logic 104 can interface with location finding module 106, network interface module 108, and/or position sensing module 114 to determine the location or position of each paired device with respect to user device 102. Additionally, each paired device, can, depending on its capabilities, provide user device 102 with information that enables user device 102 to determine the location or position of each paired device, as described with respect to wearable device 130 of the embodiment depicted in FIG. 1. In various embodiments one or any combination of (i) threshold distance(s) between user device 102 and a paired device, (ii) presence at the same physical location (e.g., the same restaurant, park, or store); and (iii) a shared network (e.g., a shared local area network) represent proximity to user device 102. In some embodiments, threshold distances and/or threshold criteria for paired devices are user-configurable settings.

If dynamic lockout logic 104 determines that a paired device is in proximity to user device 102 (decision 220, YES branch), dynamic lockout logic 104 maintains the active mode on user device 102 (operation 216). Maintaining the active mode while a paired device is in proximity to user device 102, thereby inferring that an owner or authorized user of user device 102 is in proximity to user device 102, is advantageous because it increases convenience and productivity, improves the user experience, and reduces lock screen consumption of computer resources (e.g., processor cycles, memory, and power) by reducing the frequency with which lock screens are presented requiring user authentication or another action by the user. Conversely, dynamic lockout logic 104 activates a lockout mode when dynamic lockout logic 104 determines that no paired device is in proximity to user device 102 (decision 220, NO branch). Activating the lockout mode when no paired device is in proximity advantageously permits the use of a more aggressive, more secure lockout policy (e.g., one requiring multi-factor authentication) with less likelihood of negatively impacting user convenience, productivity, and experience because the lockout mode is active when the user is not likely to need access to user device 102 based on the inferred proximity of the user to user device 102. Dynamic lockout logic 104 can thereby achieve a more optimum balance of security and convenience.

FIG. 2B depicts operations 200 of dynamic lockout logic 104 when dynamic lockout logic 104 determines that user device 102 is operating in a lockout mode (decision 204, NO branch). Accordingly, the embodiment depicted in FIG. 2B represents operations for determining whether to maintain the lockout mode (i.e., require authentication prior to granting further access to user device 102) or initiate the active mode on user device 102. In this embodiment, for example, dynamic lockout logic 104 detects foreign computing devices (operation 206), determines whether each detected foreign computing device is a recognized device or that no foreign computing devices were detected (decision 208), as described with respect to FIG. 2A. When user device 102 is in lockout mode, however, dynamic lockout logic 104 maintains the lockout mode (operation 222) in response to determining that an unrecognized foreign computing device is in proximity to user device 102 (decision 210, YES branch) rather an activating the lockout mode (operation 212). Similarly, dynamic lockout logic 104 determines whether it is configured to lock or unlock user device 102 based on the presence or absence of a paired electronic device (decision 214) if each detected foreign computing device is a recognized device (decision 208, YES branch), as described with respect to FIG. 2A. When user device 102 is in lockout mode, however, dynamic lockout logic 104 maintains the lockout mode (operation 222) in response to determining that it is not configured to lock or unlock user device 102 based on the presence or absence of a paired electronic device (decision 214, NO branch) rather than maintaining the active mode (operation 216).

If dynamic lockout logic 104 determines that it is configured to lock or unlock user device 102 based on the presence or absence of a paired electronic device (decision 214, Yes branch), dynamic lockout logic 104 identifies each paired device (operation 218), and for each paired device, determines whether the paired device (e.g., wearable device 130) is in proximity to user device 102 as described with respect to FIG. 2A. When user device 102 is in lockout mode, however, dynamic lockout logic 104 (i) maintains the lockout mode (operation 222) instead of activating the lockout mode (operation 212) in response to determining that no paired device is in proximity to user device 102 (decision 220, NO branch) and (ii) initiates the active mode (operation 224) instead of maintaining the active mode (operation 216) in response to determining that a paired device is in proximity to user device 102 (decision 220, YES branch). Accordingly, in the embodiment depicted in FIG. 2B, a person in possession of a paired device (e.g., wearable device 130) can unlock user device 102 by merely moving close enough to user device 102 with the paired device. Additionally, if unrecognized foreign computing devices are present in proximity to user device 102, the embodiment depicted in FIG. 2B maintains the security of data and functionality accessible via user device 102 by requiring authentication using the lock screen to prevent unintended initiation of the active mode when the paired device is in proximity to user device 102 but the user does not require the use of user device 102 and/or the user's attention is diverted from user device 102 (e.g., where a user intentionally places user device 102 into lock mode while concentrating on another task when strangers are present).

Figure 3:
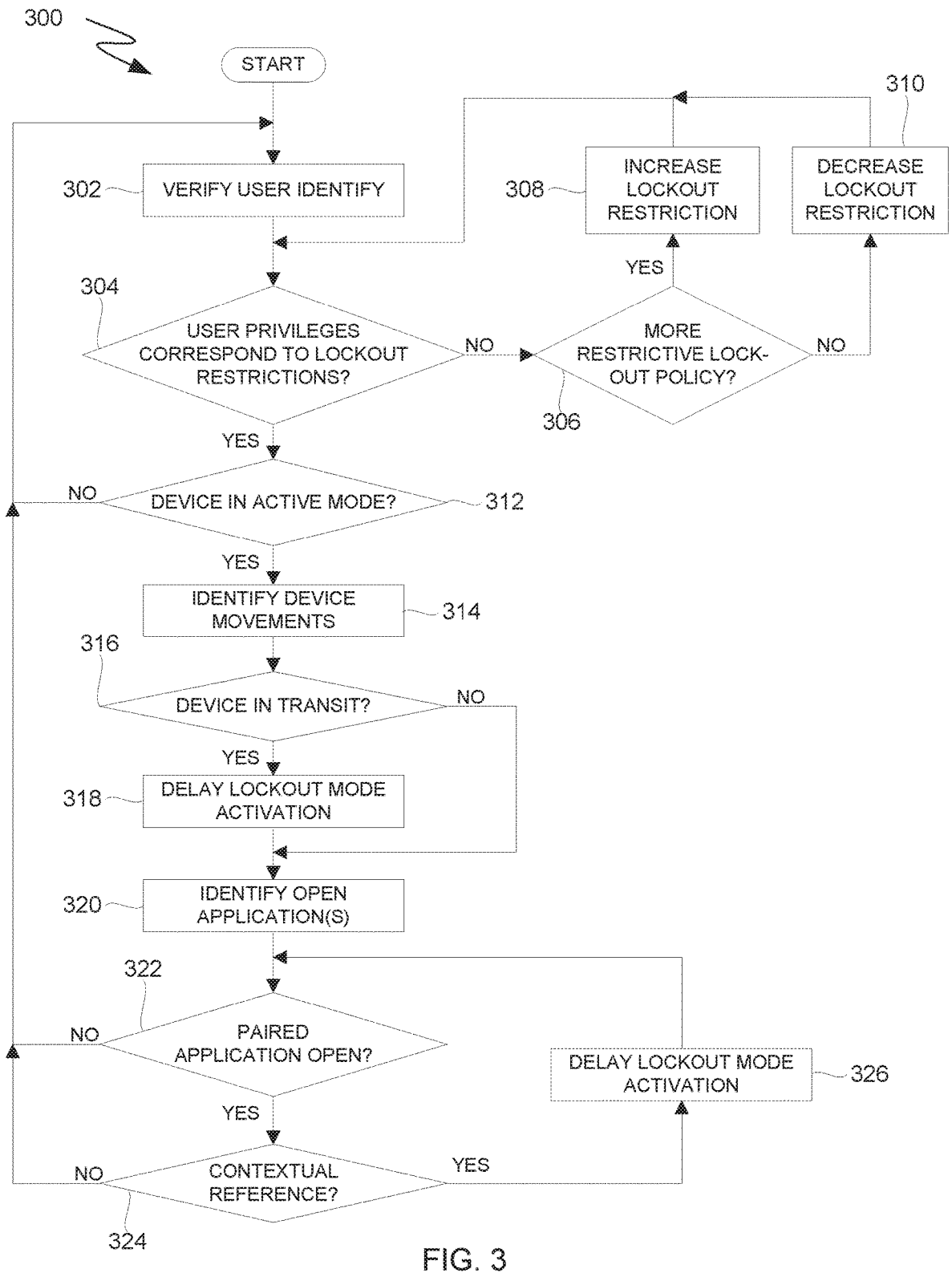
FIG. 3 is a flowchart depicting operations for a dynamic lockout technique, on a computing device within the computing environment of FIG. 1, in accordance with an embodiment of the present invention.

FIG. 3 is a flowchart depicting operations for providing a dynamic lockout policy, on a computing device within the computing environment of FIG. 1, in accordance with an embodiment of the present invention. For example, FIG. 3 is a flowchart depicting operations 300 of dynamic lockout logic 104 on user device 102 within computing environment 100. In addition to operations 200 for determining whether to maintain or initiate active and lockout modes, in various embodiments dynamic lockout logic 104 can execute operations 300 in place of or in parallel with operations 200. In general, operations 300 of dynamic lockout logic 104 operate to dynamically adjust and/or modify lockout restrictions set by dynamic lockout logic 104. In some embodiments, operations 300 affect operations 200 (e.g., by delaying lockout mode and/or increasing or decreasing lockout restrictions), as described herein. Operations 300 initiate when user device 102 is turned on or woken from a sleep mode and terminate when user device 102 is turned off or placed in a sleep mode. As used herein, executing operations 300, via one of various logical routes, and returning to operation 302 represents an iteration of operations 300.

In the embodiment depicted in FIG. 3, dynamic lockout logic 104 operates to modify lockout restrictions based on the identity of the user of user device 102. For example, an owner and/or authorized user of user device 102 may wish to have minimal lockout restrictions while user device 102 is in their use. An owner and/or or authorized user of user device 102, however, may wish to temporarily lend user device 102 to another user (e.g., to view, copy, or transcribe information), in which case it is advantageous to increase lockout restrictions over the less restrictive lockout restrictions in place while user device 102 is in use by and/or possession of the owner and/or authorized users. Accordingly, in the embodiment depicted in FIG. 3, dynamic lockout logic 104 verifies the identity of the user or possessor of user device 102 (operation 302). Dynamic lockout logic 104 can be configured to verify user identity (operation 302) at a specified interval (i.e., execute operations 300 at a predefined interval) and/or in response to a user action (e.g., picking up user device 102, turning on user device 102, and/or attempting to unlock or wake user device 102).

In the embodiment depicted in FIG. 1, dynamic lockout logic 104 interfaces with biometric identification module 112 to verify user identity (operation 302). Dynamic lockout logic 104 can thereby utilize various sensors, as described with respect to biometric identification module 112 and FIG. 1, to obtain biometric data and compare the obtained biometric data to one or more biometric profiles associated with registered users of user device 102. For example, dynamic lockout logic 104 can utilize fingerprint scans, facial scans, ocular scans, and/or vocal analysis to verify the identity of a user or possessor of user device 102 and adjust and/or modify lockout restrictions based on the user identity, as described herein. In some embodiments, dynamic lockout logic 104 utilizes data obtained from piezoelectric force sensors, capacitive sensors, and/or any other form of force and/or contact sensor integrated with user device 102 to characterize a user's or possessor's particular hold on user device 102. For example, dynamic lockout logic 104 can identify a user by characterizing the use's grip strength and hand placement on user device 102 and comparing the measured grip strength, contact area, or contact locations against one or more such profiles (e.g., profiles stored in database 116). In embodiments where user device 102 does not incorporate biometric sensors, or in any embodiment where advantageous, the identify of users can be verified by user-specific passwords, tokens, and/or pass keys in addition to or in place of biometric data.

Utilizing the verified identity of the user, dynamic lockout logic 104 identifies privileges that are associated with the user (e.g., by querying database 116 to identify a user profile that, at least in part, associates privileges with a particular person) and determines whether the identified privileges correspond to the current lockout restrictions (decision 304). If dynamic lockout logic 104 determines that the identified user privileges do not correspond to the current lockout restrictions (decision 304, NO branch), dynamic lockout logic 104 determines whether the current lock out restrictions should be increased (e.g., to implement a more restrictive, aggressive lockout policy). In various embodiments, for example, lockout restrictions can include a maximum permissible time period of inactivity, operating system and/or application functionality that is accessible while user device 102 is in lockout mode, or notifications that are available while user device 102 is in lockout mode. If, for example, dynamic lockout logic determines that an owner or authorized user of user device 102 is the current user, it is advantageous to implement a less restive, less aggressive lockout policy that permits a long time period of inactivity prior to activating the lock mode, permits increased access to operating system and application functionality while in lockout mode (e.g., read-only features), and permits the display of notifications and previews of messages (e.g., text messages, emails, voicemails, etc.) on the lock screen while in lockout mode. If, on the other hand, the current user is merely a temporary or infrequent registered user of user device 102 or is lent user device 102 for a specific purpose, it is advantageous to implement a more restrictive, more aggressive lockout policy that minimizes the permissible time period of inactivity, decreases access to operating system and application functionality while in lockout mode, and restricts the what can be displayed on the lock screen while in lockout mode.

To determine whether the current lock out restrictions should be increased based on the verified user identity (decision 306), dynamic lockout logic 104 determines whether each current lockout restriction is higher or lower than a respective privilege when the lockout restriction corresponds to a numerical value (e.g., a permitted period of inactivity), whether the verified user possesses privileges that enable the verified user to access respective and currently restricted features, or whether the verified user lacks sufficient privileges to access respective and current enabled features. In some instances, a user may have sufficient privileges to access some features while lacking sufficient privileges to access others. If dynamic lockout logic 104 determines that a current lockout restriction is less restrictive than permitted by a respective privilege, or that the lockout policy permits access to a feature and/or functionality for which the verified user does not have sufficient privileges, (decision 306, YES branch), dynamic lockout logic 104 increases the respective lockout restriction (e.g., decreases a length of the permitted period of inactivity) or disables access to the feature and/or functionality for which the verified user does not have sufficient privileges (operation 308). If dynamic lockout logic 104 determines that a current lockout restriction is more restrictive than permitted by a respective privilege, or that the lockout policy does not permit access to a feature and/or functionality for which the verified has sufficient privileges, (decision 306, NO branch), dynamic lockout logic 104 decreases the respective lockout restriction (e.g., increases a length of the permitted period of inactivity) or enables access to the feature and/or functionality for which the verified user has sufficient privileges (operation 310).

In the embodiment depicted in FIG. 3, dynamic lockout logic 104 determines whether user device 102 is in the active mode (decision 312), in response to determining that the verified user's privileges correspond to the current lockout restrictions (i.e., the current lockout policy is appropriate for the current user). If dynamic lockout logic 104 determines that user device 102 is not in active mode (i.e., that user device 102 is in lockout mode or a sleep mode; decision 312, NO branch), dynamic lockout logic 104 executes a new iteration of operations 300. If dynamic lockout logic 104 determines that user device 102 is in active mode (decision 312, YES branch), dynamic lockout logic 104 identifies and characterizes the movement of user device 102, if any (operation 314). In the embodiment depicted in FIG. 1, for example, dynamic lockout logic 104 can interface with location finding module 106 and/or position sensing module 114 to determine how user device 102 has moved in space, as described with respect to FIG. 1. Dynamic lockout logic 104, in some embodiments, can query database 116 for a log of positions and/or changes in positions over one or more periods of time (e.g., a specified count of intervals) compiled from data generated by location finding module 106 and/or position sensing module 114 from which dynamic lockout logic can characterize movements of user device 102. Based on the characterization of the movements of user device 102, dynamic lockout logic 104 determines whether a person in possession of user device 102 is in transit (decision 316).

In various embodiments, dynamic lockout logic can determine that user device 102 is "in transit" when user device 102 experiences a threshold amount and/or count of accelerations, user device 102 experiences a threshold amount and/or count of changes in velocity, a location and/or position of user device 102 changes by a threshold distance, a threshold amount of time over which user device 102 experienced any one or any combination of the aforementioned changes, as well as any other threshold that represents significant movement of user device 102. For example, the threshold(s) chosen to determine whether user device 102 is in transit (decision 316) should be chosen such that they represent measurements indicative of a person in possession of user device 102 in the act of walking, running, or travelling by means of various vehicles as opposed to acts that merely move user device 102 about the immediate vicinity of the person in possession of user device 102 (e.g., momentarily setting aside user device 102 to perform a task at a table, counter, or desk). If dynamic lockout logic 104 determines that user device 102 is in transit (decision 316, YES branch), dynamic lockout logic 104 delays lockout mode activation (operation 318). It is advantageous to delay lockout mode activation (i.e., extend the permissible timer period of inactivity) in this situation because walking or traveling via public transportation may provide numerous opportunities where it is advantageous or desirable for the user to interact with user device 102 (e.g., to view address information, a map, electronic messages, or entertainment) while at other time requiring the user to direct his or her attention towards the act of traveling (e.g., crossing roadways, paying fares, or giving directions). Delaying lockout mode activation in this manner can advantageously decreases the frequency with which a user must unlock user device 102 while travelling and thereby encourage the user to adopt more secure but less convenient form(s) of authentication. In various embodiments the delay may be set for a fixed period of time or may be extended for the entire period in which user device 102 is in transit.

In the embodiment depicted in FIG. 3, dynamic lockout logic 104 identifies any applications and/or processes that are currently executing on user device 102 (operation 320) in response to determining that user device 102 is not in transit (decision 316, NO branch) or delaying lockout mode activation (operation 318) because user device 102 is in transit. As described herein, dynamic lockout logic 104 can delay or further delay lockout mode activation based on applications and/or processes executing on user device 102. In various embodiments, dynamic lockout logic 104 can dynamically manage the lockout mode on user device 102 based one movement of user device 102 (e.g., operations 314, 316, and 318) and/or based on applications and/or processes executing on user device 102 (i.e., in some embodiments operations 314, 316, and 318, are omitted).

In some embodiments, dynamic lockout logic 104 interfaces with an operating system of user device 104 to identify applications and/or processes that are currently executing (e.g., via on or more process logs). For each identified application or process, dynamic lockout logic 104 determines whether the respective application or process is a paired application or process. In the embodiment depicted in FIG. 1, dynamic lockout logic 104 can query database 116 for a list of paired applications and/or processes and cross-reference the list of paired application with a log of executing applications and/or processes to identify executing, paired applications and/or processes. In embodiments in which dynamic lockout logic is executing operations 200, at least in part, and operations 300, at least in part, a paired application and/or process executing on user device 102 so as to delay lockout mode activation can override elements of operations 200. In some embodiments, for example, a paired application and/or process executing on user device 102 can override, at least in part, activating the lockout mode (operation 212) based on unrecognized foreign devices in proximity to user device 102 (FIG. 2A, decision 210, YES branch) and/or disable certain features on user device 102 and/or any executing applications and processes.

In general, a paired application or process is one that executes on user device 102 and that causes dynamic lockout logic 104 to delay lockout mode activation or modify the lockout because it is designated as a paired application or process. In some embodiments, dynamic lockout logic 104 is inherently provisioned with a list of applications and/or process for which lockout mode activation may be delayed or modified. In other embodiments, user(s) of user device 102 can identify applications or processes as a paired applications or processes. In general, it is advantageous to designate applications and/or processes that support tasks on user device 102 that may not require frequent user interface interaction or in which activating the lockout mode in response to user interface inactivity would be undesirable. For example, applications and/or process that facilitate watching videos, reading electronic books, or analyzing complex data sets on user device 102 may benefit from delayed lockout mode activation.

Additionally, in the embodiment depicted in FIG. 3, dynamic lockout logic 104 interfaces with one or more sensors of user device 102 to determine whether there are any contextual references to content presented on user device 102 in the environment surrounding user device 102 (decision 324). For example, dynamic logic 104 can determine whether a user of user device 102 is actively referencing content presented on user device 102 and supported by currently executing paired applications and/or processes despite a lack of user interface interaction. In some embodiments, dynamic lockout logic 104 is provisioned with speech recognition and natural language processing capabilities that, when a paired application and/or process is executing on user device 102, permit dynamic lockout logic 104 to utilize a microphone of user device 102 to determine whether a conversation including the user references content presented on user device 102 by the paired application and/or process. For example, a paired application and/or process may be associated with a list of keywords and/or phrases that dynamic lockout logic can listen for (e.g., when spoken by an owner or authorized user of user device 102). Similarly, in some embodiments, dynamic lockout logic 104 is provisioned with vision tracking capabilities that, when a paired application and/or process is executing on user device 102, permit dynamic lockout logic 104 to utilize a camera of user device 102 to determine whether the vision pattern of the user of user device 102 (e.g., an owner or authorized user) indicates that the user is referencing content presented on user device 102 by the paired application and/or process (e.g., the user's vision is frequently focused on a display of user device 102). If dynamic lockout logic 104 detects contextual reference(s) to content present on user device 102 (decision 324, YES branch), dynamic lockout logic 104 delays lockout mode activation (operation 326). If dynamic lockout logic 104 does not detect contextual reference(s) to content presented on user device 102 (decision 324, NO branch), dynamic lockout logic 104 executes a subsequent iteration of operations 300, at least in part, in accordance with various embodiments of the present invention.

In addition to utilizing sensors to determine whether any contextual references exist to content presented on user device 102, in some embodiments dynamic lockout logic 104 links paired applications and/or processes with other applications and/or processes such that lockout mode activation is delayed (e.g., operation 326) when the linked application and/or process is executing (i.e., another application or process executing on user device 102 can represent a predefined type of contextual reference to content presented on user device 102). For example, if a banking application is open on user device 102, the banking application is linked to a telephone application, and the telephone application is executing, dynamic lockout logic 104 can delay lockout mode activation or override a timeout function in the banking application while the telephone application is open (operation 326). In effect, a linked application and/or process executing on user device 102 represent another type of contextual reference that enables dynamic lockout logic 104 to infer that an owner or authorized user of user device 102 is or may continue to reference content presented on the user interface of user device 102 by the paired application and/or process. This functionality can be advantageous in situations such as when a call (i.e., a linked voice/telephone application is executing) may potentially extend beyond a lockout/timeout period of a paired application and it would be disadvantageous for the user to reauthenticate themselves if the user needs to refer back to content provided by the paired application (e.g., referencing bank account information via a secure portal while on a call to the bank's help line). Like contextual references detected via sensors of user device 102, dynamic lockout logic 104 can, in various embodiments, delay and/or modify lockout mode activation for a predefined period of time or for as long as the linked application and/or process is executing.

In various embodiments, if dynamic lockout logic 104 determines that a paired application and/or process is open and presenting content on user device 102 and that contextual references exist to content presented on user device 102 (decision 322, YES branch; decision 324, YES branch), dynamic lockout logic 104 delays lockout mode activation (operation 326). With respect to embodiments like the one depicted in FIG. 3, if the delay imposed by dynamic lockout logic 104 because user device 102 is in transit (operation 318) is longer than the delay imposed because a paired application and/or process is open (operation 326), the latter will not shorten the delay. If, however, the delay imposed by dynamic lockout logic 104 because user device 102 is in transit (operation 318) is shorter than the delay imposed because a paired application and/or process is open (operation 326), the delay due to transit will not shorten the delay. More generally in the embodiment depicted in FIG. 3, the delay resulting from detection of a contextual reference to content presented on user device 102 by the paired application (decision 324, YES branch, operation 326) is a period of time in which dynamic lockout logic 104 is suspended with respect to at least operations 300 (i.e., but, in some embodiments, not operations 200) prior to performing a subsequent iteration of decision 322 at the end of the period. If the paired application and/or process is no longer executing at the end of the period, operations 300 of dynamic lockout logic 104 can, in some embodiments, immediately release management of the lockout mode (e.g., to operations 200 of dynamic lockout logic 104), or, in other embodiments, release management of the lockout mode at a later time (e.g., at the end of count of second(s) or at a particular time). With respect to operations 200, in some embodiments delaying lockout mode activation (operation 326) includes delaying lockout mode activation even if an unrecognized foreign device is determined to be in proximity to user device 102 (FIG. 2A, decision 210, YES branch), thus overriding, at least in part, activation of the lockout mode in operations 200 of dynamic lockout logic 104. As depicted in FIG. 3, activation of the lockout mode is, delayed so long as a paired application and/or process is open and contextual references exist to content presented on user device 102. In other embodiments, an open paired application and/or process may merely delay activation of the lockout mode while a paired application or process is executing on user device 102 (i.e., irrespective of contextual references). Additionally, in some embodiments, dynamic lockout logic 104 can delay lockout mode activation (operation 326) for a fixed, predefined time period irrespective of executing processes or applications (decision 322) and/or contextual references (decision 324; i.e., proceed to execute a subsequent iteration of operations 300 at operation 302 at the end of the time period).

In addition to modifying when the lockout mode is activated, dynamic lockout logic 104 can, in some embodiments, modify the functionality of the lockout mode and/or the paired application/process in place of or in addition to delaying lockout mode activation (operation 326). In some embodiments, functionality of a paired application or process is disabled after a period of time even though dynamic logic 104 has not yet placed user device 102 in lockout mode. In other embodiments, operations 200 can affect the functionality of paired applications and/or processes. In general, it can be advantageous to disable functionality that permits a user of user device 102 to write data and/or modify data objects within the paired application and/or user device 102 while permitting read-only functionality (i.e., functionality that permits the reading/viewing of data object but not the writing/modification of data objects) within the paired application and/or on user device 102. If, for example, an unrecognized foreign device is detected in proximity to user device 102 while a paired application is executing and contextual references exist to content presented on user device 102 by the paired application (operations 200, FIG. 2B, decision 208, NO branch, decision 210, YES branch; operations 300, FIG. 3, decision 322, YES branch, decision 324, YES branch), operations 200 of dynamic lockout logic 104 can cause dynamic lockout logic 104 to disable at least some functionality of the paired application while operations 300 of dynamic lockout logic 104 cause dynamic lockout logic 104 to preserve some functionality, thereby partially overriding operations 200. In a specific example involving a paired banking application, dynamic lockout logic 104 delays lockout mode activation (and/or timeout of a banking application session; operation 326) based on contextual references to content presented on user device 102 by the paired banking application but disables the ability to schedule financial transaction and change profile information, without reauthentication, based on the presence of an unrecognized foreign device in proximity to user device 102. Accordingly, a user of the paired banking application may advantageously continue to refer to content presented on user device 102 by the paired banking application (e.g., an account statement and other read-only features) while, for example, on a call or in a meeting with a bank representative. Despite permitting continued use of read-only functionality, other, more sensitive, functionality within the paired banking application is protected from misuse by others. Modifying lockout mode activation in this manner can advantageously decreases the frequency with which a user must unlock user device 102 while utilizing paired applications and/or processes and thereby encourage the user to adopt more secure but less convenient form(s) of authentication, as similarly described with respect to various embodiments of the present invention.

Figure 4:
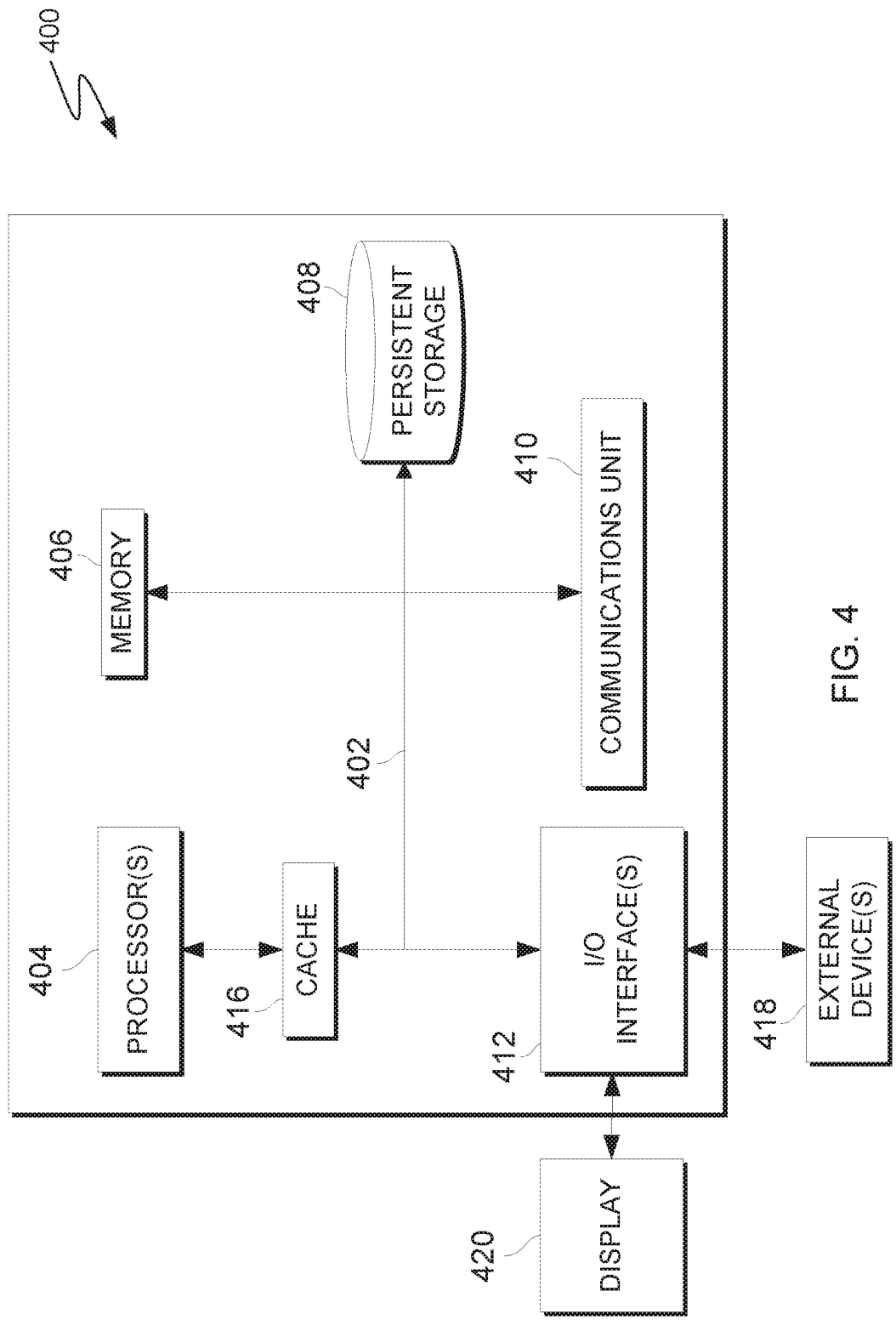
FIG. 4 is a block diagram of components of a computing device executing operations for a dynamic lockout technique, in accordance with an embodiment of the present invention.

FIG. 4 is a block diagram of components of a computing device, generally designated 400, in accordance with an embodiment of the present invention. In one embodiment, computing system 400 is representative of user device 102 within computing environment 100, in which case user device 102 includes dynamic lockout logic 104.

It should be appreciated that FIG. 4 provides only an illustration of one implementation and does not imply any limitations with regard to the environments in which different embodiments may be implemented. Many modifications to the depicted environment may be made.

Computing system 400 includes processor(s) 402, cache 406, memory 404, persistent storage 410, input/output (I/O) interface(s) 412, communications unit 414, and communications fabric 408. Communications fabric 408 provides communications between cache 406, memory 404, persistent storage 410, communications unit 414, and input/output (I/O) interface(s) 412. Communications fabric 408 can be implemented with any architecture designed for passing data and/or control information between processors (such as microprocessors, communications and network processors, etc.), system memory, peripheral devices, and any other hardware components within a system. For example, communications fabric 408 can be implemented with one or more buses or a crossbar switch.

Memory 404 and persistent storage 410 are computer readable storage media. In this embodiment, memory 404 includes random access memory (RAM). In general, memory 404 can include any suitable volatile or non-volatile computer readable storage media. Cache 406 is a fast memory that enhances the performance of processor(s) 402 by holding recently accessed data, and data near recently accessed data, from memory 404.

Program instructions and data used to practice embodiments of the present invention may be stored in persistent storage 410 and in memory 404 for execution by one or more of the respective processor(s) 402 via cache 406. In an embodiment, persistent storage 410 includes a magnetic hard disk drive. Alternatively, or in addition to a magnetic hard disk drive, persistent storage 410 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 410 may also be removable. For example, a removable hard drive may be used for persistent storage 410. Other examples include optical and magnetic disks, thumb drives, and smart cards that are inserted into a drive for transfer onto another computer readable storage medium that is also part of persistent storage 410.

Communications unit 414, in these examples, provides for communications with other data processing systems or devices. In these examples, communications unit 414 includes one or more network interface cards. Communications unit 414 may provide communications through the use of either or both physical and wireless communications links. Program instructions and data used to practice embodiments of the present invention may be downloaded to persistent storage 410 through communications unit 414.

I/O interface(s) 412 allows for input and output of data with other devices that may be connected to computer system 400. For example, I/O interface(s) 412 may provide a connection to external device(s) 416 such as a keyboard, keypad, a touch screen, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 410 via I/O interface(s) 412. I/O interface(s) 412 also connect to display 418.

Display 418 provides a mechanism to display or present data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, a "module" is any set of hardware, firmware, and/or software that operatively performs one or more functions attributed to it and without regard to whether the module: (i) can be implemented as a single unit of software and/or hardware or interconnected units of software and/or hardware; (ii) shares computing resources with one or more other modules or computer processes; (iii) is represented as a set of program instructions within a larger set of program instructions; (iv) can implemented as program instructions stored on a single storage device, memory, or medium or a plurality of storage devices, memories, or media; and/or (vi) is mechanically, electrically, or communicatively connected to one or more other modules or computer resources. A "sub-module" is a module within a module.

As used herein, a list of alternatives such as "at least one of A, B, and C" should be interpreted to mean "at least one A, at least one B, at least one C, or any combination of A, B, and C."

Additionally, the phrase "based on" should be interpreted to mean "based, at least in part, on."

The term "exemplary" means of or relating to an example and should not be construed to indicate that any particular embodiment is preferred relative to any other embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing dynamic lockout functionality, comprising:
    identifying, by a mobile computing device having a user interface in an active mode, one or more foreign computing devices that are connected to a shared network;
    in response to determining, by the mobile computing device, that each foreign computing device of the one or more foreign computing devices is a recognized device, determining, by the mobile computing device, whether a paired device is in proximity to the mobile computing device based on a signal transmitted by the paired device;
    in response to determining, by the mobile computing device, that the paired device is in proximity to the mobile computing device, the mobile computing device maintaining the active mode;
    identifying, by the mobile computing device, a new foreign computing device that is connected to the shared network; and
    in response to determining, by the mobile computing device, that the new foreign computing device is an unrecognized device that is in proximity to the mobile computing device, activating a lockout mode for the user interface while the paired device is in proximity to the mobile computing device.

2. The method of claim 1, further comprising:
    identifying, by the mobile computing device, one or more applications executing on the mobile computing device while the user interface of the mobile computing device is in the active mode; and
    in response to determining, by the mobile computing device, that one of the one or more applications executing on the mobile computing device is a paired application executing on the mobile computing device, delaying activation of the lockout mode for the user interface by overriding, at least in part, activation of the lockout mode in response to determining, that the new foreign computing device is unrecognized and in proximity to the mobile computing device.

3. The method of claim 2, wherein the mobile computing device delays activation of the lockout mode for a predefined period of time.

4. The method of claim 2, further comprising:
    detecting, by one or more sensors of the mobile computing device, a contextual reference to content presented on the user interface of the mobile computing device by the paired application executing on the mobile computing device, wherein activation of the lockout mode is delayed based on the paired application executing and presenting content on the user interface of the mobile computing device and the detection of the contextual reference.

5. The method of claim 4, wherein detecting, by one or more sensors of the mobile computing device, the contextual reference to the content presented on the user interface of the mobile computing device by the paired application executing on the mobile computing device further comprises:
    listening, using one or more microphones of the mobile computing device, for one or more keywords associated with the content presented on the user interface of the mobile computing device by the paired application executing on the mobile computing device, wherein any keyword of the one or more keywords spoken by the user of the mobile computing device represents a respective contextual reference to the content presented on the user interface of the mobile computing device by the paired application.

6. The method of claim 5, wherein delaying activation of the lockout mode comprises:
    providing, within the paired application, functionality that permits the mobile computing device to present data objects within the paired application the user interface of the mobile computing device.

7. The method of claim 6, wherein delaying activation of the lockout mode by overriding, at least in part, activation of the lockout mode comprises:
    disabling, within the paired application, functionality that permits the mobile computing device to modify data objects within the paired application.

8. The method of claim 2, wherein determining, by the mobile computing device, that one of the one or more applications executing on the mobile computing device is a paired application executing on the mobile computing device further comprises:
   in response to detecting, by the mobile computing device, a linked application executing on the mobile computing device, delaying activation of the lockout mode for the user interface, wherein the linked application is linked with the paired application such that activation of the lockout mode is delayed based on the content presented on the user interface of the mobile computing device by the paired application and the linked application executing on the mobile device.

9. A computer program product for managing dynamic lockout functionality, the computer program product comprising:
   a computer readable storage medium and program instructions stored on the computer readable storage medium, the program instructions comprising:
      program instructions to identify, by a mobile computing device having a user interface in an active mode, one or more foreign computing devices that are connected to a shared network;
      program instructions to, in response to determining, by the mobile computing device, that each foreign computing device of the one or more foreign computing devices is a recognized device, determine, by the mobile computing device, whether a paired device is in proximity to the mobile computing device based on a signal transmitted by the paired device;
      program instructions to, in response to determining, by the mobile computing device, that the paired device is in proximity to the mobile computing device, maintain the active mode on the mobile computing device;
      program instructions to identify, by the mobile computing device, a new foreign computing device that is connected to the shared network; and
      program instructions to, in response to determining, by the mobile computing device, that the new foreign computing device is an unrecognized device that is in proximity to the mobile computing device, activating a lockout mode for the user interface while the paired device is in proximity to the mobile computing device.

10. The computer program product of claim 9, the program instructions further comprising:
   program instructions to identify, by the mobile computing device, one or more applications executing on the mobile computing device while the user interface of the mobile computing device is in the active mode; and
   program instructions to, in response to determining, by the mobile computing device, that one of the one or more applications executing on the mobile computing device is a paired application executing on the mobile computing device, delay activation of the lockout mode for the user interface by overriding, at least in part, activation of the lockout mode in response to determining, that the new foreign computing device is unrecognized and in proximity to the mobile computing device.

11. The computer program product of claim 10, the program instructions further comprising:
   program instructions to detect, by one or more sensors of the mobile computing device, a contextual reference to content presented on the user interface of the mobile computing device by the paired application executing on the mobile computing device, wherein activation of the lockout mode is delayed based on the paired application executing and presenting content on the user interface of the mobile computing device and the detection of the contextual reference.

12. The computer program product of claim 11, wherein the program instructions to detect, by one or more sensors of the mobile computing device, the contextual reference to the content presented on the user interface of the mobile computing device by the paired application executing on the mobile computing device further comprise:
   program instructions to listen, using one or more microphones of the mobile computing device, for one or more keywords associated with the content presented on the user interface of the mobile computing device by the paired application executing on the mobile computing device, wherein any keyword of the one or more keywords spoken by the user of the mobile computing device represents a respective contextual reference to the content presented on the user interface of the mobile computing device by the paired application.

13. The computer program product of claim 12, wherein the program instructions to delay activation of the lockout mode comprise:
   program instructions to provide, within the paired application, functionality that permits the mobile computing device to present data objects within the paired application the user interface of the mobile computing device.

14. The computer program product of claim 13, wherein the program instructions to delay activation of the lockout mode by overriding, at least in part, activation of the lockout mode comprise:
   program instructions to disable, within the paired application, functionality that permits the mobile computing device to modify data objects within the paired application.

15. A computer system for managing dynamic lockout functionality, the computer system comprising:
   one or more computer processors;
   one or more computer readable storage media;
   program instructions stored on the one or more computer readable storage media for execution by at least one of the one or more processors, the program instructions comprising:
      program instructions to identify, by a mobile computing device having a user interface in an active mode, one or more foreign computing devices that are connected to a shared network;
      program instructions to, in response to determining, by the mobile computing device, that each foreign computing device of the one or more foreign computing devices is a recognized device, determine, by the mobile computing device, whether a paired device is in proximity to the mobile computing device based on a signal transmitted by the paired device;
      program instructions to, in response to determining, by the mobile computing device, that the paired device is in proximity to the mobile computing device, maintain the active mode on the mobile computing device;
      program instructions to identify, by the mobile computing device, a new foreign computing device that is connected to the shared network; and
      program instructions to, in response to determining, by the mobile computing device, that the new foreign computing device is an unrecognized device that is in proximity to the mobile computing device, activating a lockout mode for the user interface while the paired device is in proximity to the mobile computing device.

16. The computer system of claim 15, the program instructions further comprising:
   program instructions to identify, by the mobile computing device, one or more applications executing on the mobile computing device while the user interface of the mobile computing device is in the active mode; and
   program instructions to, in response to determining, by the mobile computing device, that one of the one or more applications executing on the mobile computing device is a paired application executing on the mobile computing device, delay activation of the lockout mode for the user interface by overriding, at least in part, activation of the lockout mode in response to determining, that the new foreign computing device is unrecognized and in proximity to the mobile computing device.

17. The computer system of claim 16, the program instructions further comprising:
   program instructions to detect, by one or more sensors of the mobile computing device, a contextual reference to content presented on the user interface of the mobile computing device by the paired application executing on the mobile computing device, wherein activation of the lockout mode is delayed based on the paired application executing and presenting content on the user interface of the mobile computing device and the detection of the contextual reference.

18. The computer system of claim 17, wherein the program instructions to detect, by one or more sensors of the mobile computing device, the contextual reference to the content presented on the user interface of the mobile computing device by the paired application executing on the mobile computing device further comprise:
   program instructions to listen, using one or more microphones of the mobile computing device, for one or more keywords associated with the content presented on the user interface of the mobile computing device by the paired application executing on the mobile computing device, wherein any keyword of the one or more keywords spoken by the user of the mobile computing device represents a respective contextual reference to the content presented on the user interface of the mobile computing device by the paired application.

19. The computer system of claim 18, wherein the program instructions to delay activation of the lockout mode comprise:
   program instructions to provide, within the paired application, functionality that permits the mobile computing device to present data objects within the paired application the user interface of the mobile computing device.

20. The computer system of claim 19, wherein the program instructions to delay activation of the lockout mode by overriding, at least in part, activation of the lockout mode comprise:
   program instructions to disable, within the paired application, functionality that permits the mobile computing device to modify data objects within the paired application.

* * * * *